United States Patent [19]

Kadkade

[11] Patent Number: 4,724,633

[45] Date of Patent: Feb. 16, 1988

[54] METHOD OF ACCELERATING DEHISCENCE AND OF REDUCING PULL FORCE OF FRUITS

[75] Inventor: Prakash G. Kadkade, Marlboro, Mass.

[73] Assignee: GTE Laboratories Incorporated, Waltham, Mass.

[21] Appl. No.: 516,393

[22] Filed: Jul. 22, 1983

[51] Int. Cl.$^4$ .............................................. A01G 1/00
[52] U.S. Cl. .................................. 47/58; 47/DIG. 6
[58] Field of Search ............ 47/58, DIG. 6; 313/571, 313/642, 579, 639, 112, 489, 636, 632

[56] References Cited

U.S. PATENT DOCUMENTS 4,041,642  8/1977  Krugler et al. .................. 47/DIG. 6
4,109,414  8/1978  Kadkade ......................... 47/DIG. 6

FOREIGN PATENT DOCUMENTS 2481883  11/1981  France ............................ 47/DIG. 6

OTHER PUBLICATIONS

Bickford, E. D. et al. (1973), Chapt. 15, "Future Lighting for Plant Growth", *Lighting for Plant Growth* (pp. 209–211 only), The Kent State University Press.
Kossuth, S. V. et al. (1977), "Fruit Removal Force, Cellulase, and Ethylene Production in Release and Ethephon–Treated Oranges", J. Amer. Soc. Hort. Science, 102(5): 609–612.

*Primary Examiner*—James R. Feyrer
*Attorney, Agent, or Firm*—Fred Fisher

[57] ABSTRACT

A process for accelerating dehiscence and reduction in "pull force" of fruits and nuts (in order to facilitate the mechanical harvesting process) by exposing the crops to far-red night-break lighting treatments at certain stages of fruit growth and development.

4 Claims, No Drawings

METHOD OF ACCELERATING DEHISCENCE AND OF REDUCING PULL FORCE OF FRUITS

CROSS-REFERENCE TO RELATED APPLICATIONS

This application is related to co-pending U.S. patent applications filed by the applicant: Ser. No. 472,449 filed Mar. 7, 1983 entitled "Method of Inhibiting Premature Budding of Short-Day Floral Crops", Ser. No. 476,080 filed Mar. 17, 1983 entitled "Application of Specific Lighting Treatments for Promotion of Anthocyanin in Economically Important Crops", Ser. No. 06/514,920 filed July 18, 1983 entitled "Method of Expediting Sugar Accumulation in Fruits of Economically Important Crops", and Ser. No. 06/516,393 filed concurrently herewith entitled "Method of Thinning Fruitlets or Fruits of Trees".

BACKGROUND OF THE INVENTION

1. Field of the Invention

This invention relates to a method of accelerating dehiscence and of reducing "pull force" in fruits, and, in particular, to such a method as to facilitate a mechanical harvesting process. Accordingly, it is a general object of this invention to provide new and improved methods of such character.

2. Description of the Prior Art

Prior to this invention, various techniques were performed to accelerate dehiscence and to reduce "pull force" in fruits. One technique utilized chemical growth regulators for such purposes. The regulators could include ethylene gas, ethephon, release, and dikegulac.

Disadvantageously, chemical regulators that have been used by growers for accelerating dehiscence and reduction of "pull force" of fruits have not met the obvious requirements of reasonable cost and practicability of application. Moreover, they tended to produce undesirable side effects (defoliation, root growth inhibition, fruit damage including the reduction in storage-life, etc.) and often exhibited a pronounced variability in responses.

INFORMATION DISCLOSURE STATEMENT

As a means of complying with the duty of disclosure set forth in 37 CFR 1.56, the following is a listing of patents and publications which may be pertinent. This statement shall not be construed as a representation that a search has been made or that no better art exists.

| U.S. Pat. No. | Patentee | Issue Date |
| --- | --- | --- |
| 4,060,933 | Prakash G. Kadkade | 12/6/77 |
| 4,109,414 | Prakash G. Kadkade | 8/29/78 |

The patentee of the foregoing patents is the applicant of this invention.

Kadkade, U.S. Pat. No. 4,060,933, discloses a method for stimulating organogenesis of explants in a tissue culture by illuminating the explant during at least a portion of its differentiation stage with light having a predominant spectral emission at a wavelength at approximately 660 nm.

Kadkade, U.S. Pat. No. 4,109,414, discloses a method for controlling abscission of plant parts by illuminating the plants during the night period with light having a wavelength selected from the group consisting of wavelengths in the order of 420 nm, 550 nm, 660 nm, and 740 nm.

The following publications may be of interest to the reader:

Kossuth, S. V., and Biggs, R. V.: Fruit removal force, cellulase, and ethylene production in release and ethephon-treated oranges. J. Amer. Hort. Sci. 102 (5): 609–612, 1977.

Buttram, J. R. 1970 Harvesting processing oranges with the use of cycloheximide. Proc. Fla. State Hort. Soc. 83:253–256.

Cooper, W. C. and W. H. Henry: 1968 Field trials with potential abscission chemicals as an aid to mechanical harvesting of citrus in Florida. Proc. Fla. State hort. Soc. 81:62–68.

Holm, R. E. and Wilson, W. C. 1977: Ethylene and fruit loosening from combinations of citrus abscission chemicals. J. Amer. Soc. Hort. Sci. 102 (5): 576–579.

Micke, W. and D. Kester: 1978 Almond Orchard management. pg. 46–56.

SUMMARY OF THE INVENTION

Another object of this invention is to provide a new and improved method of accelerating dehiscence and of reducing "pull force" of fruits of economically important crops using night-break lighting treatments without causing either any phytotoxicity or adverse effects on normal growth and development of crops.

Other objects of this invention are to provide a new and improved method of accelerating dehiscence and of reducing "pull force" of fruits in such a manner as to provide the following advantages:

Accelerate maturity of fruit and drying of kernel.

Enhance the exposure of in-shell nut and reduce water content of kernel, and as a consequence minimize the drying costs to the grower.

Stimulate the formation of an abscission zone between the fruit and the peduncle and thus reduce the "pull force" required to remove the fruit and/or nut from tree.

Facilitate earlier harvest and thus improve the chance of escaping the ravages of naval orangeworm and fungal pathogens.

Reduce fruit damage and wear and tear on mechanical harvesters and improve an overall harvest efficiency.

In accordance with one embodiment of this invention, a method of accelerating dehiscence and of reducing "pull force" of fruits of various crops includes the exposure of such crops to far-red night-break lighting treatments at certain stages of fruit growth and development. With certain features of the invention, the crops can be selected from the group consisting of almond, walnut, pistachio, pecan, grape, olive, citrus, and cherry. The almond crop can include the Nonpareil and Merced varieties; the citrus can include calamondin (miniature orange). The night-break exposure can be for a period of four hours per night.

In accordance with another embodiment of this invention, a method of accelerating dehiscence and of reducing "pull force" of fruits of the citrus crop calamondin includes exposing the crop to far-red night-break lighting provided by light from fluorescent or high-intensity-discharge lamp means having a λ-emission peak centered around 740 nm and/or 760 nm. In accordance with certain features of the invention, the light can be provided with a intensity of 1 $\mu W/cm^2$ to 100 $\mu W/cm^2$ for a period of four hours per night. The period can occur from 8 p.m. to 12 p.m. The exposure of the crop can be initiated when most of the fruits of the crop have completed the second phase of their development.

In accordance with yet another embodiment of this invention, a method of accelerating dehiscence and of reducing "pull force" of nuts of an almond crop includes exposing the crop to far-red night-break lighting provided by light from far-red emitting high-intensity-discharge lamp means. In accordance with certain features of the invention, the lamp means can include 1500 watts potassium mercury lamp means with a synthetic resin material filter, such as that available under the trademark "Plexiglas", associated therewith for cutting off emissions below 700 nm. The light can be provided with an intensity of 0.1 $\mu W/cm^2$ to 100 $\mu W/cm^2$ for a period of four hours per night. The period can be 9 p.m. to 1 a.m.

DESCRIPTION OF PREFERRED EMBODIMENT(S)

One of the major problems confronting fruit (almond, walnut, pistachio, pecan, grape, olive, citrus, cherry, etc.) growers has been the failure of adequate dehiscence and/or loosening of fuit at the time of harvest. This affected harvesting operation and often resulted in reduced yields. Prior art methods for acceleration of dehiscence and/or reduction of "pull force" of fruits were inadequate. Hand picking is very expensive and time consuming. Moreover, reduction of "pull force" of fruits during harvest is critically important from the viewpoint of reducing wear and tear on mechanical harvesters. There are many factors (environmental and cultural practices) which affect dehiscence and/or loosening of fruits, one of which is the influence of light.

The influence of night-break lighting on acceleration of dehiscence and/or reduction of "pull force" of fruits was investigated using selected crops grown under greenhouse (model citrus crop—calamondin) and field (almond-var. "Nonpareil" and "Merced") conditions.

Calamondin (miniature orange) plants were exposed to night-break lighting with far-red (fluorescent or high-intensity-discharge: λ-emission peak centered around 740 nm and/or 760 nm, respectively; intensity having a range from 1 $\mu W/cm^2$ to 100 $\mu W/cm^2$) lights for a period of four hours each night (8 p.m. to 12 p.m.). Night-break lighting treatment was started when most of the fruits had completed the second phase of their development.

The field night-break lighting experiments with almonds (var. "Nonpareil" and/or "Merced") were performed using far-red emitting high-intensity-discharge lamps constructed of 1500 watts potassium mercury lamps with a synthetic resin material filter placed in front of it to cut off all emissions bleow 700 nm. A "Plexiglas" trademark brand fiter, available under the designation FRF-700, is effective. Wide angle fixtures (HDF series, commercially available from Sylvania) were utilized to operate the high-intensity-discharge lamps. All fixtures were mounted on poles about 30 feet above ground level. Replicates at three or four irradiance levels (0.1 $\mu W/cm^2$–100 $\mu W/cm^2$, as determined by the distance from the light source) were established at different locations within the field. Light irradiances were measured using a Tektronix J-16 photometer/radiometer with a J-6512 probe (flat response, ±7 percent from 450 nm to 950 nm). Night-break lighting treatment (four hours every night: 9 p.m.–1 a.m.) was commenced when almond hull split was approximately 5 percent.

The measurements on dehiscence or hull split and reduction of "pull force" of fruits were made at different intervals during almond development. Dehiscence measurements were made by the visual estimate of the percent hull split along the ventral suture of fruits. Fruit removal force or reduction in "pull force" of fruits measurements were recorded using a modified hand-held Hunter-spring mechanical force gauge.

In general, far-red night break lighting treatment resulted in a significant acceleration of dehiscence and/or reduction of "pull force" of fruits relative to unlighted control groups (Calamondin: 32 percent decrease in "pull force"; almonds: 20 percent increase in dehiscence and 29 percent reduction in "pull force" of fruits). Fruit and/or nut quality at the time of harvest, and subsequent crop growth and development, were not affected adversely by night-break lighting treatment.

Various far-red light sources having a λ-emission peak centered around 740 nm and/or 760 nm have been found to be advantageous.

Table I, below, provides data for a pair of high pressure, potassium mercury lamps, 250 watts each. The λ-emission peak is centered around 740 nm.

TABLE I

| | HIGH PRESSURE | |
|---|---|---|
| λ | Output Watts | Percent Output Watts of Total Lamp Output of the Visible Radiation |
| 380–400 | 0.07 | 0.44 |
| 400–420 | 0.15 | 0.98 |
| 420–440 | 0.08 | 0.56 |
| 440–460 | 0.10 | 0.65 |
| 460–480 | 0.12 | 0.81 |
| 480–500 | 0.13 | 0.87 |
| 500–520 | 0.14 | 0.91 |
| 520–540 | 0.21 | 1.44 |
| 540–560 | 0.10 | 0.69 |
| 560–580 | 0.35 | 2.34 |
| 580–600 | 0.65 | 4.36 |
| 600–620 | 0.40 | 2.64 |
| 620–640 | 0.50 | 3.32 |
| 640–660 | 0.48 | 3.23 |
| 660–680 | 0.52 | 3.48 |
| 680–700 | 1.19 | 7.94 |
| 700–720 | 1.04 | 6.92 |
| 720–740 | 3.13 | 20.93 |
| 740–760 | 2.51 | 16.74 |
| 760–780 | 0.09 | 0.60 |
| 780–800 | 2.63 | 17.96 |
| 800–820 | 0.39 | 2.62 |

In contrast, Table II, below, provides data for a pair of low pressure, potassium mercury lamps, 400 watts each, in which the λ-emission peak is centered around 760 nm.

TABLE II

| | LOW PRESSURE | |
|---|---|---|
| λ | Output Watts | Percent Output Watts of Total Lamp Output of the Visible Radiation |
| 300–400 | 0.12 | 0.48 |
| 400–420 | 0.35 | 1.33 |
| 420–440 | 0.16 | 0.61 |
| 440–460 | 0.18 | 0.68 |
| 460–480 | 0.21 | 0.79 |
| 480–500 | 0.23 | 0.87 |
| 500–520 | 0.22 | 0.89 |
| 520–540 | 0.34 | 1.32 |
| 540–560 | 0.12 | 0.48 |
| 560–580 | 0.31 | 1.18 |
| 580–600 | 0.74 | 2.86 |
| 600–620 | 0.29 | 1.13 |

TABLE II-continued
LOW PRESSURE

| λ | Output Watts | Percent Output Watts of Total Lamp Output of the Visible Radiation |
|---|---|---|
| 620-640 | 0.32 | 1.23 |
| 640-660 | 0.23 | 0.89 |
| 660-680 | 0.18 | 0.68 |
| 680-700 | 1.37 | 5.26 |
| 700-720 | 0.34 | 1.32 |
| 720-740 | 1.27 | 4.87 |
| 740-760 | 4.11 | 15.84 |
| 760-780 | 7.53 | 28.98 |
| 780-800 | 6.97 | 26.85 |
| 800-820 | 0.38 | 1.45 |

Table III, below, provides data for a 1500 watts high pressure potassium mercury lamp. An FRF-700 filter was used to effectively eliminate light transmission in wavelengths below 690 nm. The λ-emission peak, centered around 740 nm, is based upon a 250 watts potassium mercury lamp.

TABLE III

| λ (nm) | Output Watts | Percent Output Watts of Total Lamp Output of the Visible Radiation |
|---|---|---|
| 690-700 | 13.22 | 5.89 |
| 700-720 | 15.54 | 6.92 |
| 720-740 | 47.02 | 20.93 |
| 740-760 | 37.61 | 16.74 |
| 760-780 | 1.36 | 0.60 |
| 780-800 | 39.44 | 17.96 |
| 800-820 | 5.89 | 2.62 |

Table IV provides data for a 1500 watts low pressure potassium mercury lamp having a λ emission peak centered around 760 nm. An FRF-700 filter was used to effectively eliminate light transmission in wavelengths below 690 nm. The λ-emission peak was based on 400 W low pressure lamp.

TABLE IV

| λ (nm) | Output Watts | Percent Output Watts of Total Lamp Output of the Visible Radiation |
|---|---|---|
| 690-700 | 9.08 | 4.66 |
| 700-720 | 2.58 | 1.32 |
| 720-740 | 9.49 | 4.87 |
| 740-760 | 30.85 | 15.84 |
| 760-780 | 56.45 | 28.98 |
| 780-800 | 52.29 | 26.85 |
| 800-820 | 2.83 | 2.45 |

The effects of night-break lighting with far-red lights (740 nm) on almond "pull force" measurements are given in tables V and VI below. The experimental designs each include two blocks of trees with two treatments assigned randomly within each section.

One of the major problems confronting almond growers has been the failure of adequate loosening of fruits at the time of harvest due to an incomplete development of abscission zone. This affects harvesting operation and often results in reduced yields. The purpose of this investigation was, therefore, to determine if far-red night-break lighting treatment alone and/or in conjunction with a specific growth regulator could result in a reduction of "pull force" of nuts.

In Table V, each treatment consists of four "old" almond (var. "Nonpareil") trees. Night-break lighting was started on July 28, 1981, one month prior to the normal harvest, when "Nonpareil" almond hull split was approximately 10 percent. Final "pull force" measurements for removal of nuts (var. "Nonpareil") were made on Aug. 27, 1981, two days prior to normal harvest period.

TABLE V

| Treatment | Average "Pull Force" Required (lbs.) | Percent Reduction in "Pull Force" Relative to Control |
|---|---|---|
| Control | 3.22 ± 0.41 | |
| Night-break Lighted (λ Emission Peak At 740 nm) | 2.19 ± 0.42 | 32 |

Night-break lighting, in general, reduced the "pull force" required for removal of nuts by 32 percent on the average relative to the control group.

In Table VI, each treatment consists of 12 almond (var. "NePlus") trees. Night-break lighting was started on July 10, 1982 when almond hull split was approximately 5 percent.

TABLE VI

| Treatment | Average "Pull Force" Required (lbs.) | Percent Reduction in "Pull Force" Relative to Control |
|---|---|---|
| Control | 0.87 ± 0.09 | |
| Night-break Lighted (λEmitted Peak at 740 nm) | 0.65 ± 0.07 | 26.2 |

Though the earlier 1981 study had shown that night-break lighting with far-red lights was effective in loosening almonds, it was the objective of the 1982 study to re-evaluate the effects of far-red night-break lighting treatment on reduction of "pull force" of almonds at the time of harvest. Night-break lighting was started on July 10, 1982 when almond hull split was approximately 5 percent. The measurements on dehiscence or hull split and reduction of "pull force" of fruits were made at different intervals during almond development. Night-break lighting, in general, enhanced the dehiscence and reduced the "pull force" by 20 percent and 26 percent, respectively, on the average relative to the control groups. These findings indicate that night-break lighting with far-red lights is effective in loosening almonds and this approach could be useful in facilitating the mechanical harvesting of almond crop.

Alternatively, other high-intensity-discharge light sources, including incandescent lamps, having light watts output emissions centered maximally (at least 70 percent) between 740 nm to 780 nm are expected to be more efficient than the light sources tested. Further, it is believed that night-break lighting treatment with far-red lights for a period of two to three hours, centered around midnight, would also accomplish the objects of this invention. The practice of this invention can be extended to other fruit (citrus, cherry, grape, olives, apple, etc.) and nut (walnut, pistachio, pecan, macadamia, etc.) crops.

This invention provides for the acceleration of dehiscence and/or the reduction of fruit removal force or "pull force" of fruits of economically valuable crops using specific light treatments without causing any adverse effects on plant growth and development. It further facilitates the mechanical harvesting of crop and maintains the integrity of fruit and/or nut harvest quality features, while keeping the environment free from hazardous chemical residues. Lights can be applied and removed at any time without the complications arising from the residual amounts of the exogenous stimulus remaining in the plant tissue and soil.

What is claimed is:

1. A method of accelerating dehiscence and of reducing "pull force" of fruits of the citrus crop calamondin comprising exposing said crop to far-red night-break lighting provided by light from fluorescent or high-intensity-discharge lamp means having a λ-emission peak centered around 740 and/or 760 nm.

2. The method as recited in claim 1 wherein said light is provided with an intensity of 1 $\mu W/cm^2$ to 100 $\mu W/cm^2$ for a period of four hours per night.

3. The method as recited in claim 2 wherein said period of four hours per night occurs during the time period 8 p.m. to 12 p.m.

4. The method as recited in claim 3 wherein said exposing of said crop is initiated when most of said fruits of said crop have completed the second phase of their development.

* * * * *